(12) United States Patent
Arakane et al.

(10) Patent No.: US 12,537,905 B2
(45) Date of Patent: Jan. 27, 2026

(54) RECORDING APPARATUS WITH ADJUSTABLE RECORDING MATERIAL USAGE

(71) Applicant: BROTHER KOGYO KABUSHIKI KAISHA, Nagoya (JP)

(72) Inventors: Satoru Arakane, Nagoya (JP); Shota Morikawa, Nagoya (JP); Tomoya Kondo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/505,305

(22) Filed: Nov. 9, 2023

(65) Prior Publication Data

US 2024/0179265 A1 May 30, 2024

(30) Foreign Application Priority Data

Nov. 30, 2022 (JP) ................................. 2022-191286

(51) Int. Cl.
*H04N 1/60* (2006.01)
(52) U.S. Cl.
CPC ................................. *H04N 1/6091* (2013.01)
(58) Field of Classification Search
None
See application file for complete search history.

(56) References Cited

U.S. PATENT DOCUMENTS

| 2009/0128838 | A1* | 5/2009 | Yamamoto | G06K 15/1825 |
| | | | | 358/1.9 |
| 2012/0154470 | A1* | 6/2012 | Nishitani | G06K 15/1868 |
| | | | | 347/14 |
| 2017/0286816 | A1* | 10/2017 | Smith | H04N 1/00015 |

FOREIGN PATENT DOCUMENTS

| JP | 2009-141941 A | | 6/2009 | |
| JP | 2009143070 A | * | 7/2009 | |
| JP | 2009159363 A | * | 7/2009 | ........... H04N 1/6025 |

OTHER PUBLICATIONS

English translation of JP-2009159363-A. (Year: 2009).*
English translation of JP-2009143070-A. (Year: 2009).*

* cited by examiner

*Primary Examiner* — Thomas D Lee
(74) *Attorney, Agent, or Firm* — Merchant & Gould P.C.

(57) ABSTRACT

There is provided a recording apparatus including: a recording part configured to perform a recording of an image onto a recording medium with a recording material; and a controller configured to adjust, based on an adjustment value, an amount of the recording material which is to be used at a time of the recording. The controller is configured to execute, based on an index value regarding dirtiness, a changing processing of changing at least one of the adjustment value and a value regarding the adjustment value, in a direction of decreasing the amount of the recording material.

6 Claims, 10 Drawing Sheets

FIG. 1

VERTICAL DIRECTION
PAPER WIDTH DIRECTION
CONVEYING DIRECTION

RECORDING APPARATUS WITH ADJUSTABLE RECORDING MATERIAL USAGE

REFERENCE TO RELATED APPLICATIONS

This application claims priority from Japanese Patent Application No. 2022-191286 filed on Nov. 30, 2022. The entire content of the priority application is incorporated herein by reference.

BACKGROUND ART

Conventionally, there is a known technique of adjusting the density of image data in accordance with an adjustment value.

DESCRIPTION

In a case that the amount of the recording material becomes great, any dirtiness (due to the recording material) might occur, depending on the kind, etc., of the recording medium. For example, regarding a record medium which is easily swelled due to the recording material permeated or penetrated thereto, the recording part might be dirtied by the recording material in a case that the swelled recording medium makes contact with the recording part, or the recording medium might be dirtied due to occurrence of any jamming or clogging of the recording medium.

An object of the present disclosure is to provide a recording apparatus capable of suppressing a dirtiness (smudge, stain, etc.) which might occur due to such a situation that the amount of the recording material is great.

According to an aspect of the present disclosure, there is provided a recording apparatus including: a recording part and a controller. The recording part is configured to perform a recording of an image onto a recording medium with a recording material. The controller is configured to adjust, based on an adjustment value, an amount of the recording material which is to be used at a time of the recording. The controller is configured to execute, based on an index value regarding dirtiness, a changing processing of changing at least one of the adjustment value and a value regarding the adjustment value, in a direction of decreasing the amount of the recording material.

FIRST EMBODIMENT

Figure 1:
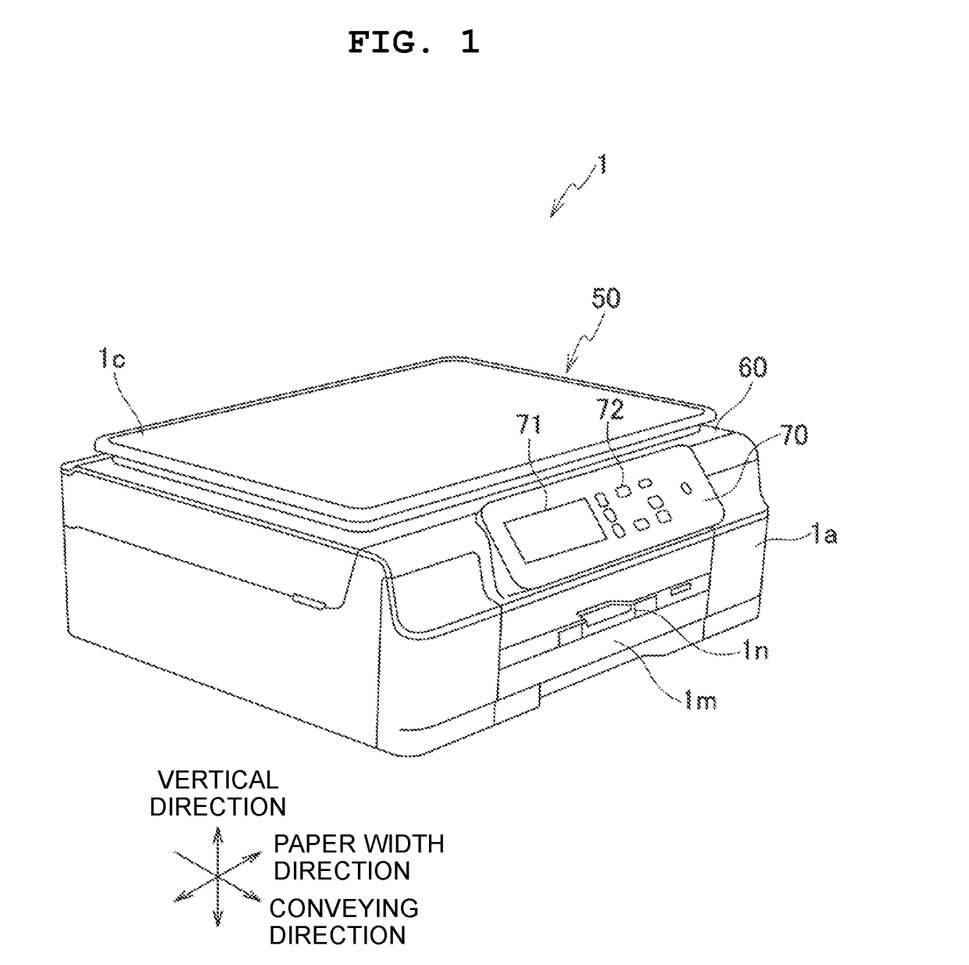
FIG. 1 is a perspective view of a multifunction peripheral 1.

A multifunction peripheral 1 according to a first embodiment of the present disclosure is provided with: a casing 1a, a reading part 50 of a flat-bed type provided on an upper part of the casing 1a, a cover 1c attached to the upper part of the casing 1a to be openable and closable, and a paper feed tray 1m and a paper discharge tray 1n which can be pulled or drawn with respect to the casing 1a, as depicted in FIG. 1. A panel 70 is provide on a front surface of the casing 1a. The term "front surface" means a surface on the downstream side in a conveying direction. The panel 70 includes a display 71 of a touch-panel system and operation buttons 72.

Figure 2:
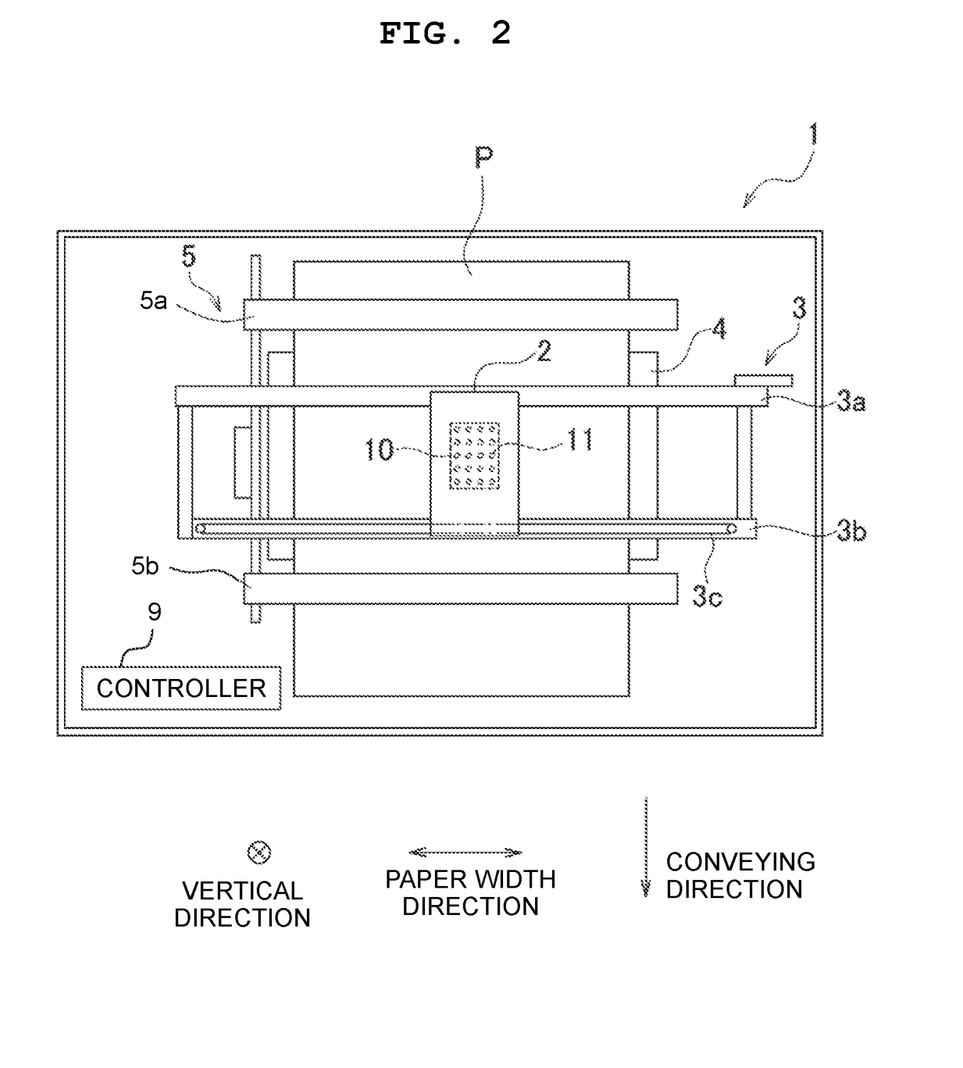
FIG. 2 is a plan view depicting the inner part of a casing of the multifunction peripheral 1.

As depicted in FIG. 2, a head 10 having a plurality of nozzles 11 in a lower surface thereof, a carriage 2 configured to hold the head 10, a scanning part 3 configured to move the carriage 2 in a paper width direction, a platen 4 configured to support a paper sheet P (paper P, sheet P) from therebelow, a conveyor 5 configured to convey the paper sheet P in the conveying direction, and a controller 9 are provided on the inside of the casing 1a.

The paper sheet P corresponds to a "recording medium" of the present disclosure, the head 10 corresponds to a "recording part" of the present disclosure, and the multifunction peripheral 1 corresponds to a "recording apparatus" of the present disclosure. The paper width direction and the conveying direction are orthogonal to a vertical direction, and are orthogonal to each other.

The scanning part 3 includes a pair of guides 3a and 3b configured to support the carriage 2 and a belt 3c connected to the carriage 2. The guides 3a and 3b and the belt 3c extend in the paper width direction. In a case that a carriage motor 3M (see FIG. 3) is driven by a control of the controller 9, the belt 3c runs, which in turn moves the carriage 2 in the paper width direction along the guides 3a and 3b.

The platen 4 is arranged at a location below the carriage 2 and the head 10. The paper sheet P is placed on an upper surface of the platen 4.

The conveyor 5 has a paper feed roller (not depicted in the drawings) provided on the paper feed tray 1m (see FIG. 1) and two roller pairs 5a and 5b. The head 10, the carriage 2 and the platen 4 are arranged between the roller pair 5a and the roller pair 5b in the conveying direction. In a case that a conveying motor 5M (see FIG. 3) is driven by a control of the controller 9, the paper sheet P arranged in the paper feed tray 1m (see FIG. 1) is fed by the paper feed roller and then is conveyed in the conveying direction by the roller pairs 5a and 5b, passes a location below the head 10 and is received by the paper discharge tray 1n (see FIG. 1).

Figure 3:
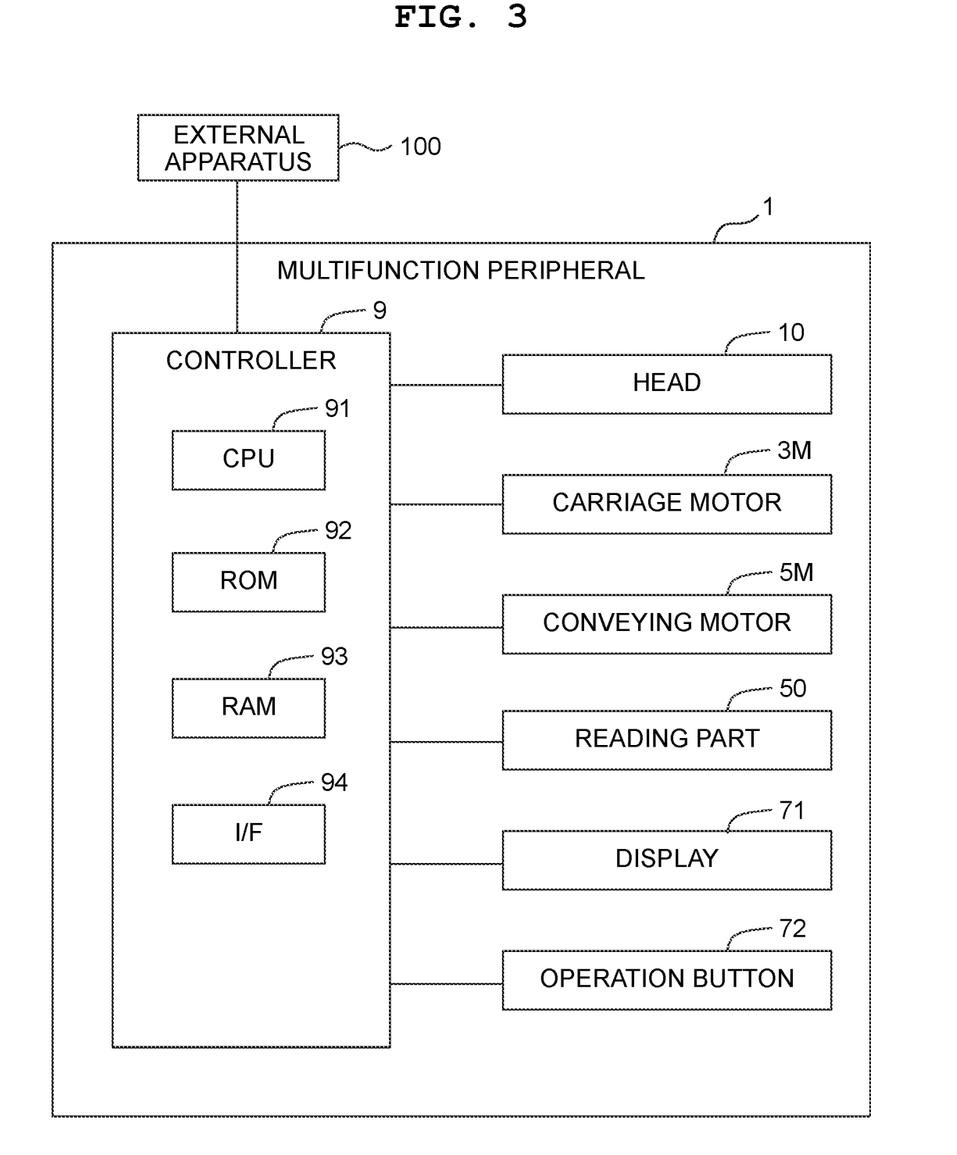
FIG. 3 is a block diagram depicting the electrical configuration of the multifunction peripheral 1.

As depicted in FIG. 3, the controller 9 has a CPU (Central Processing Unit) 91, a ROM (Read Only Memory) 92, a RAM (Random Access Memory) 93 and I/F (Interface) 94. A program, data, etc., by which the CPU 91 performs a variety of kinds of control are stored in the ROM 92. The RAM 93 temporarily stores data used by the CPU 91 in a case that the CPU 91 executes a program. The I/F 94 performs transmittance and receipt of data with outside (an external apparatus).

The CPU 91 executes a recording control based on data (including image data indicating an image) received by the I/F 94 and in accordance with the program, the data, etc., stored in the ROM 92 and/or the RAM 93. The recording control is a control regarding a recording of an image on (to)

the paper sheet P, and includes a conveying processing of causing the paper sheet P to be conveyed by the conveyor 5 in the conveying direction by a predetermined amount, and a scanning processing of causing the ink to be discharged or ejected from the plurality of nozzles 11 with respect to the paper sheet P, while causing the head 10 to be moved in the paper width direction by the scanning part 3. With this, dots of the ink are formed on the paper sheet P and the image is recorded.

The controller 9 including the CPU 91 corresponds to a "controller" of the present disclosure, the RAM 93 corresponds to a "memory" of the present disclosure, and I/F 94 corresponds to a "receiving part" of the present disclosure.

The reading part 50 has a manuscript table (original table) 60 (see FIG. 1) constructed of the upper part of the casing 1a and a reding unit (not illustrated in the drawings) provided on the inside of the casing 1a. In a state that the cover 1c is opened, a manuscript (original) is placed on the original table 60. Afterwards, the cover 1c is closed to thereby suppress any entrance of a light from outside into the reading unit. Image data of the manuscript read by the reading unit is transmitted to the controller 9.

The multifunction peripheral 1 has: a scan function of reading an image of the manuscript by the reading part 50; a copy function of recording, on the paper sheet P, the image read by the reading part 50; a facsimile function of recording, on the paper sheet P, an image based on facsimile data received from an external apparatus 100; and a print function of recording, on the paper sheet P, an image based on a recording instruction received from the external apparatus 100.

Figure 4A:
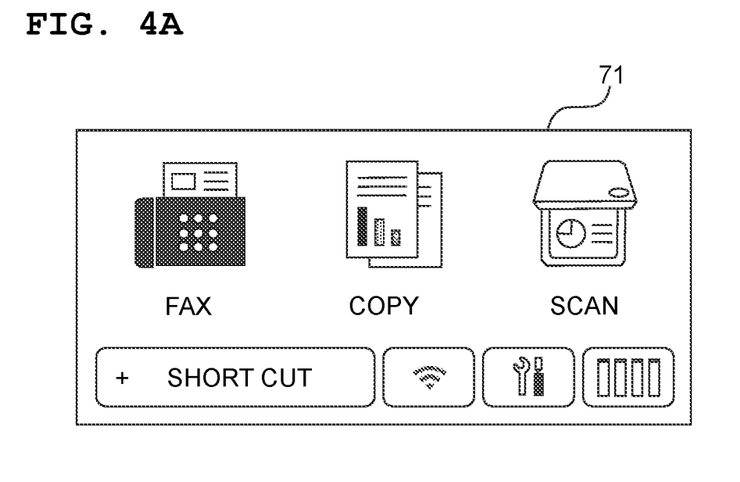
FIGS. 4A and 4B are each a schematic view depicting an example of a screen displayed on a display 71 of the multifunction peripheral 1.

In response to a user touching an icon regarding a function, desired by the user, among icons (see FIG. 4A) which are displayed on the display 17 and each of which indicates one of the scan function, the copy function and the facsimile function, the CPU 91 executes an application program corresponding to the desired function. Regarding the print function, in response to the recording instruction received from the external apparatus 100, the CPU 91 executes an application program corresponding to the print function.

Figure 4B:
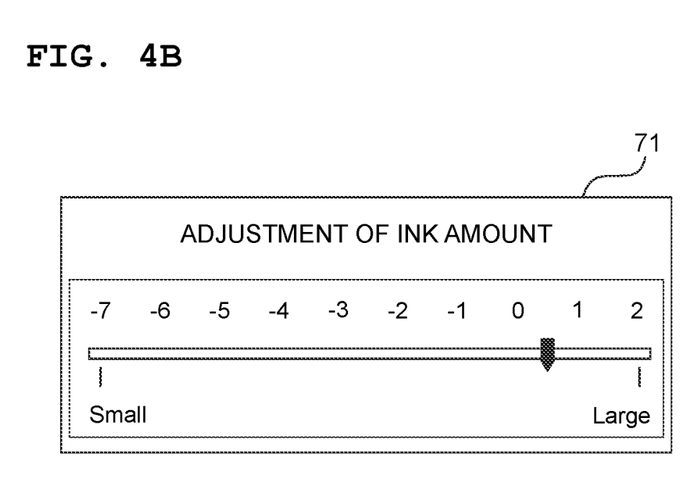

In the application program corresponding to the print function, the CPU 91 is capable of adjusting the amount of the ink to be used during the recording. Specifically, in response to the user instructing, in the ink amount adjusting screen (see FIG. 4B) displayed on the display 71, the CPU 91 adjusts the amount of the ink to be used during the recording.

Here, an explanation will be given about the application program corresponding to the print function, with reference to FIG. 5.

Firstly, the CPU 91 determines as to whether or not the recording instruction is received from the external apparatus 100 (step S1).

In a case that the CPU 91 determines that the recording instruction is not received from the external apparatus 100 (step S1: NO), the CPU 91 repeats the processing of step S1.

In a case that the CPU 91 determines that the recording instruction is received from the external apparatus 100 (step S1: YES), the CPU 91 converts an RGB (Red, Green, Blue) value corresponding to a color of an image indicated by the image data included in the recording instruction into a CMYK value corresponding to a color of the ink (step S2: first conversion processing). The RGB value corresponds to a "pixel value" of the present disclosure, and the CMYK value corresponds to a "density value" of the present disclosure.

After the processing of step S2, the CPU 91 determines as to whether or not the adjustment of the amount of the ink is to be performed, based on a signal from the display 71 (see FIG. 4B) (step S3).

In a case that the CPU 91 determines that the adjustment of the amount of the ink is not to be performed (step S3: NO), the CPU 91 proceeds the processing to the processing of step S7.

In a case that the CPU 91 determines that the adjustment of the amount of the ink is to be performed (step S3: YES), the CPU 91 determines as to whether or not an adjustment value indicated by the above-described signal is greater than a predetermined value (step S4). Here, the predetermined value is a certain adjustment value in a direction of increasing the amount of the ink. For example, the predetermined value may be an adjustment value "0" or an adjustment value "+1" in the display 71 (see FIG. 4B).

In a case that the CPU 91 determines that the adjustment value is greater than the predetermined value (step S4: YES), the CPU 91 determines as to whether or not the paper sheet P which is to be used in the recording is a plain paper (step S5). For example, the CPU 91 may perform the determination in the processing of step S5 based on information included in the recording instruction received in the processing of step S1, information from a paper sheet sensor (not depicted in the drawings) provided on the paper feed tray 1m, etc.

As the paper sheet P, glossy paper, etc., is used, in addition to the plain paper. The plain paper corresponds to a "first recording medium" of the present disclosure, and the glossy paper corresponds to a "second recording medium" of the present disclosure. The plain paper is more likely to swell, than the glossy paper, due to permeation or penetration of the ink thereto. Accordingly, regarding the plain paper, in a case that the amount of the ink at the time of the recording becomes great, the head 10 might be dirtied by the ink (in the swelled paper sheet P) in a case that the swelled paper sheet P makes contact with the head 10, or the paper sheet P might be dirtied due to any jamming or clogging of the paper sheet P occurred in the inside of the head 10. Namely, the plain paper is more likely to cause the dirtiness of the head 10 and/or the dirtiness (smudge) of the paper sheet P than the glossy paper, and an "index value regarding dirtiness" of the plain paper and an "index value regarding dirtiness" of the glossy paper are mutually different. In the present embodiment, the kind of the paper sheet P corresponds to the "index value regarding dirtiness".

In a case that the CPU 91 determines that the paper sheet P is the plain paper (step S5: YES), the CPU 91 changes the adjustment value in a direction of decreasing the amount of the ink and adjusts the CMYK value obtained in the processing of step S2 based on the adjustment value which has been changed (after having been subjected to the change) (step S6a).

The processing of step S6a corresponds, together with the processing of step S6b which will be described later on, to a "changing processing" of the present disclosure. A change width of the adjustment value in the processing of step S6a is greater than a change width of the adjustment value in the processing of step S6b. For example, in a case that an adjustment value "0" (zero) is designated on the display 71 (see FIG. 4B), it is allowable that the adjustment value is changed to "−4" in the processing of step S6a, and to "−3" in the processing of step S6b.

In a case that the CPU 91 determines that the paper sheet P is not the plain paper (step S5: NO), the CPU 91 changes the adjustment value in the direction of decreasing the amount of the ink and adjusts the CMYK value, obtained in the processing of step S2, based on the adjustment value which has been changed (step S6b).

In a case that the CPU 91 determines that the adjustment value is less than the predetermined value (step S4: NO), the CPU 91 adjusts the CMYK value, obtained in the processing of step S2, based on the adjustment value, without changing the adjustment value (step S6c).

After the processing of step S6a, S6b or S6c, the CPU 91 proceeds the processing to step S7.

In the processing of step S7, the CPU 91 converts the CMYK value into discharge data (step S7: second conversion processing). The discharge data indicates a volume (any one of a large droplet, intermediate (middle) droplet, a small droplet and zero) of the ink to be discharged from each of the plurality of nozzles 11 per one recording cycle (a time required for the paper sheet P to move relative to the head 10 by a unit distance corresponding to a resolution of the image to be formed on the paper sheet P).

In a case that the adjustment in the direction of decreasing the amount of the ink is performed, it is allowable that, in a certain recording cycle, the volume of the ink is changed from the large droplet to the middle droplet or the volume of the ink is changed from the middle droplet to the small droplet. Further, in a case that the adjustment in a direction of increasing the amount of the ink is performed, it is allowable that, in a certain recording cycle, the volume of the ink is changed from the middle droplet to the large droplet or the volume of the ink is changed from the small droplet to the middle droplet.

After the processing of step S7, the CPU 91 controls the conveyor 5, the scanning part 3 and the head 10 so as to record the image on the paper sheet P (step S8). After the processing of step S8, the CPU 91 ends this program.

Figure 5:
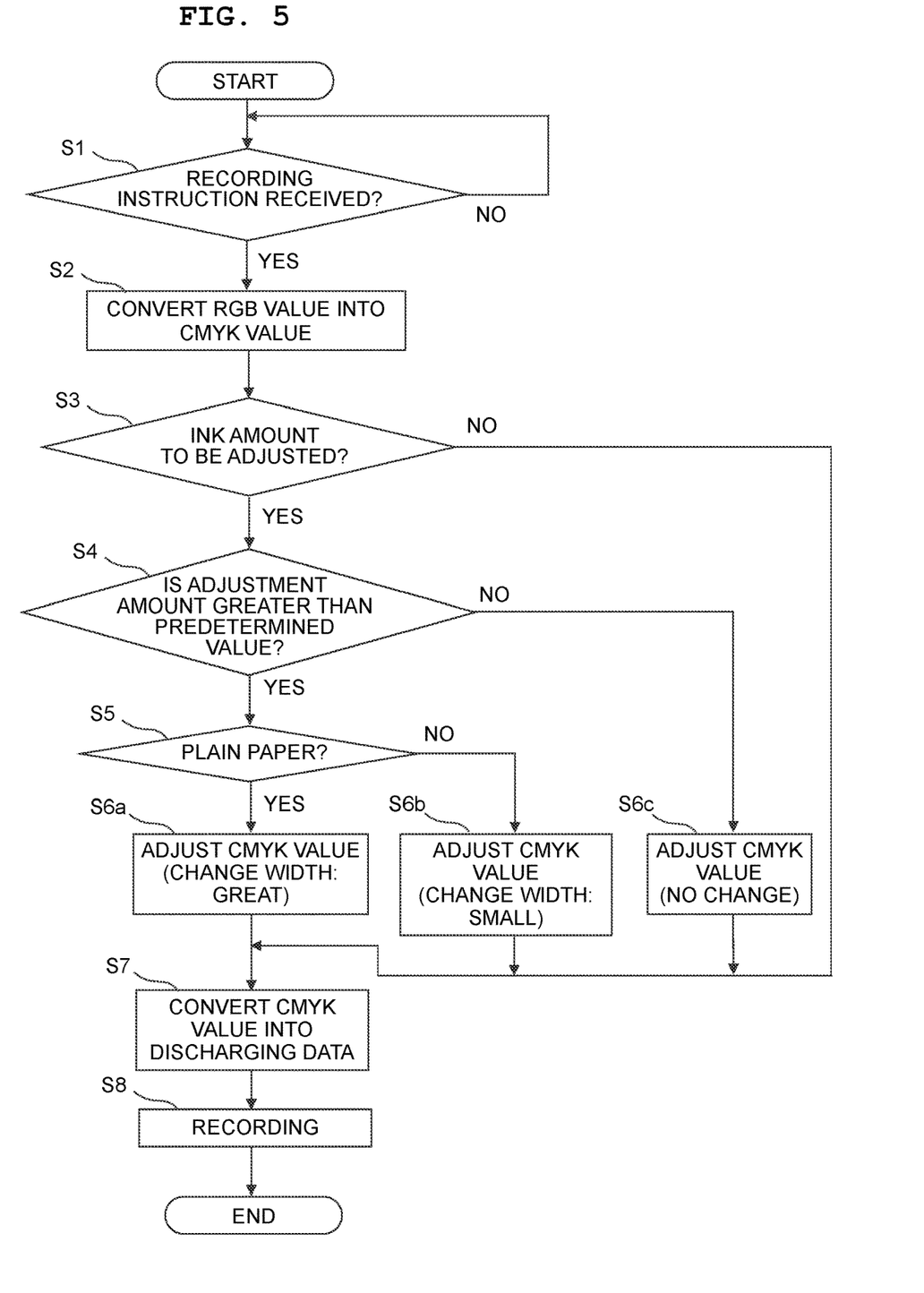
FIG. 5 is a flow chart indicating an application program corresponding to a print function executed by a CPU of the multifunction peripheral 1.

As described above, according to the present embodiment, the adjustment value is changed in the direction of decreasing the amount of the ink, based on the kind of the paper sheet P (the index value regarding the dirtiness) (see the processing of each of steps S0a and S6b of FIG. 5). With this, it is possible to suppress the dirtiness which might occur due to such a situation that the amount of the recording material is great.

In the present embodiment, the adjustment value is changed (see the processing of each of steps S6a and S6b of FIG. 5), whereas in a second embodiment of present disclosure (to be described later on), the maximum value of the adjustment value is changed. In this case, by automatically changing the adjustment value itself, it is possible to suppress, in a more ensured manner, the dirtiness which might occur due to such a situation that the amount of the recording material is great.

The plain paper is more likely to swell, than the glossy paper, due to permeation or penetration of the ink thereto. Accordingly, regarding the plain paper, in a case that the amount of the ink at the time of the recording becomes great, the head 10 might be dirtied by the ink (on the paper sheet P) in a case that the swelled paper sheet P makes contact with the head 10, or the paper sheet P might be dirtied due to any jamming or clogging of the paper sheet P. In view of this, in the present embodiment, the change width is made to be different between the plain paper and the glossy paper, so as to make the amount of the recording material to be smaller in the case of the plain paper (see the processing of each of steps S0a and S6b of FIG. 5). With this, it is possible to suppress the dirtiness which might occur due to such a situation that the amount of the recording material is great.

In a case that the amount of the ink is to be adjusted, the CPU 91 executes the changing processing and adjusts the CMYK value based on the adjustment value which has been changed (step S6a or S6b), after the CPU 91 has converted the RGB value into the CMYK value (step S2), and before the CPU 91 converts the CMYK value into the discharge data (step S7), as depicted in FIG. 5. In a case that the changing processing is executed before the processing of step S2 and the RGB value is adjusted based on the adjustment value which has been changed, any deviation in the hue is more likely to occur. On the other hand, in a case that the changing processing is performed after the processing of step S5 and the discharge data is adjusted based on the adjustment value which has been changed, the adjustment is more likely to be extreme. In the present embodiment, by executing the changing processing after the processing of step S2 and before the processing of step S7 and by adjusting the CMYK value based on the adjustment value which has been changed, it is possible to appropriately adjust the amount of the ink, while suppressing any deviation in the hue and/or any extreme adjustment.

Second Embodiment

Next, a second embodiment of the present disclosure will be explained.

In the first embodiment, the adjustment value is changed, whereas in the second embodiment, the maximum value of the adjustment value is changed.

Figure 6A:
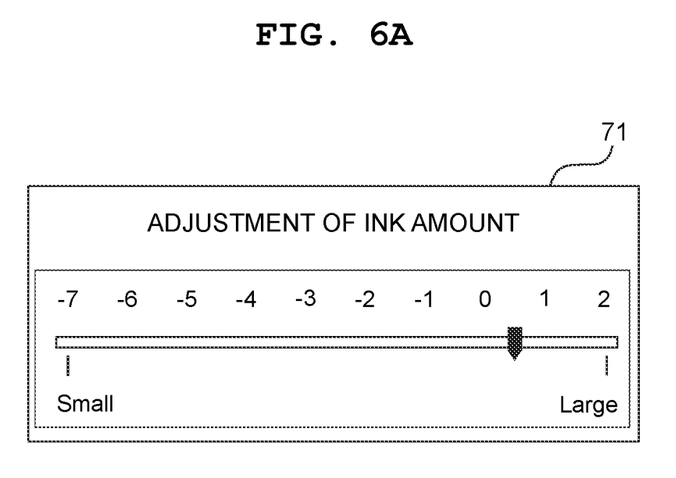
FIGS. 6A and 6B are each a schematic view depicting an example of a screen displayed on a display 71 of a multifunction peripheral.
Figure 6B:
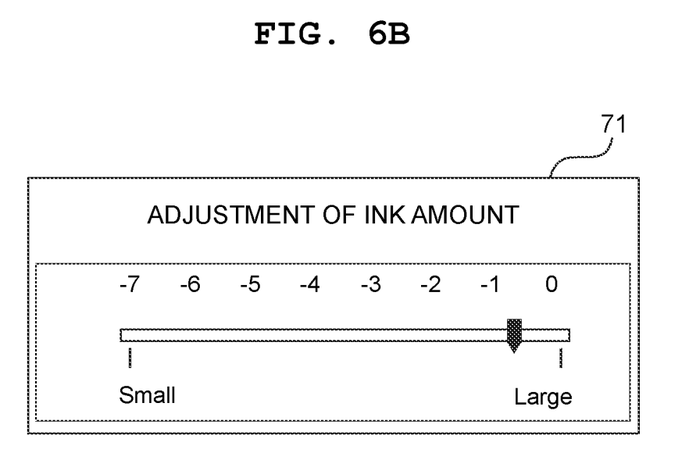

The term "maximum value of the adjustment value" is a value regarding the adjustment value, and is the maximum value, of the adjustment value, which is inputtable via the display 71 (see FIGS. 6A and 6B). For example, in a case that the CPU 91 determines that the paper sheet P is the glossy paper, the CPU 91 makes the maximum value of the adjustment value to be "2" as depicted in FIG. 6A, whereas in a case that the CPU 91 determines that the paper sheet P is the plain paper, the CPU 91 makes the maximum value of the adjustment value to be "0" as depicted in FIG. 6B.

According to the second embodiment, the CPU 91 changes the maximum value, of the adjustment value, which is inputtable by the user, based on the kind of the paper sheet P (the index value regarding dirtiness), in the direction of decreasing the amount of the ink (see FIGS. 6A and 6B). With this, it is possible to restrict an input by the user and to suppress the dirtiness which might occur due to such a situation that the amount of the recording material is great.

Third Embodiment

Next, a third embodiment of the present disclosure will be explained.

In the first embodiment, the changing processing is executed based on the kind of the paper sheet P, whereas in the third embodiment, the changing processing is executed based on ON/OFF of a dirtiness suppressing function. Namely, in the first embodiment, the kind of the paper sheet P corresponds to the "index value regarding dirtiness", whereas in the third embodiment, the ON/OFF of the dirtiness suppressing function corresponds to the "index value regarding dirtiness".

In an application program corresponding to the print function (see FIG. 7), the CPU 91 executes a processing similar to that in the first embodiment (see FIG. 5), except for the processing of step S5.

In a case that the CPU 91 determines that the adjustment value is greater than the predetermined value (step S4: YES), the CPU 91 determines as to whether or not the dirtiness suppressing function is ON (step S35), instead of executing the processing of step S5 in the flow chart of FIG. 5. For example, in a case that an ON signal of the dirtiness suppressing function is received by the I/F 94 from the display 71 or the operation buttons 72 (see FIG. 3), the CPU 91 determines that the dirtiness suppressing function is (turned) ON.

Figure 7:
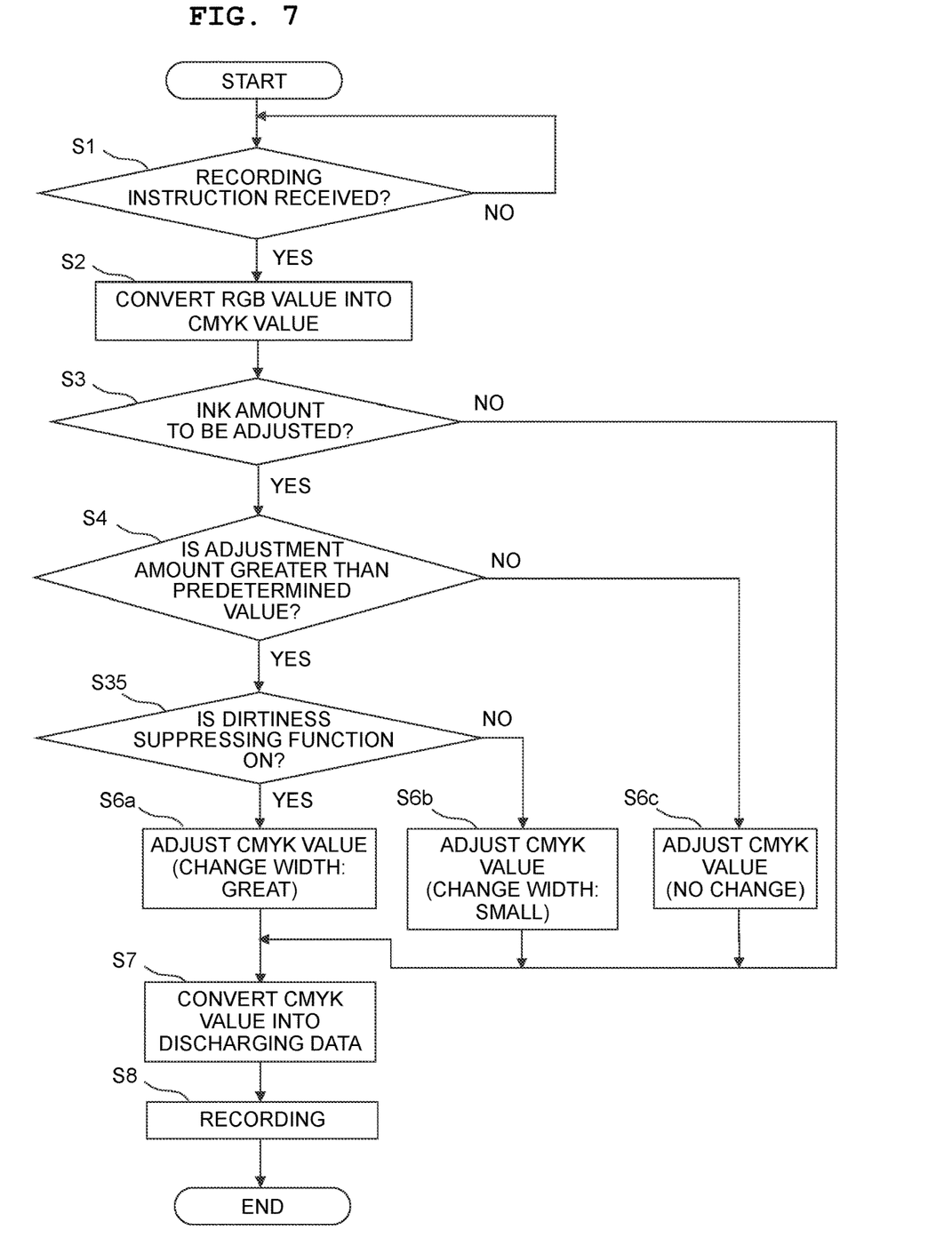
FIG. 7 is a flow chart indicating an application program corresponding to a print function executed by a CPU of a multifunction peripheral.

In a case that the CPU 91 determines that the dirtiness suppressing function is (turned) ON (step S35: YES), the CPU 91 executes the processing of step S6a. In a case that the CPU 91 determines that the dirtiness suppressing function is not (turned) ON (step S35: NO), the CPU 91 executes the processing of step S6b.

According to the third embodiment, by changing the adjustment value in the direction decreasing the amount of the ink in the case that the dirtiness suppressing function is turned ON, in accordance with the instruction by the user, it is possible to suppress the dirtiness which might occur due to such a situation that the amount of the recording material is great.

Fourth Embodiment

Next, a fourth embodiment of the present disclosure will be explained.

In the first embodiment, the changing processing is executed without performing a notification to the user, whereas in the fourth embodiment, the notification to the user is performed before the changing processing is executed.

In an application program corresponding to the print function (see FIGS. 8A and 8B), the CPU 91 further executes processings of steps S40 and S41, in addition to the processing in the first embodiment (see FIG. 5).

Figure 9:
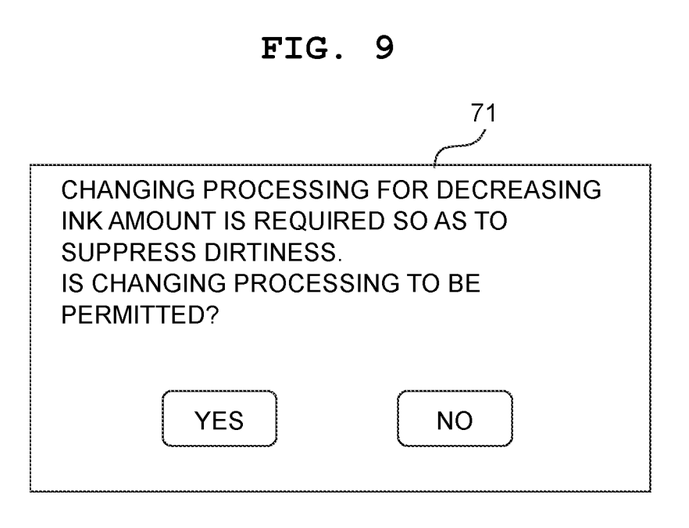
FIG. 9 is a schematic view depicting an example of a screen displayed on the display 71 in the processing of step S40 of FIG. 8A.

In a case that the CPU 91 determines that the adjustment value is greater than the predetermined value (step S4: YES), the CPU 91 performs a notification that the changing processing is required via a displaying on the displaying 71, a voice or sound by a speaker (not depicted in the drawings), etc. (step S40: notifying processing). For example, a screen as depicted in FIG. 9 is displayed on the display 71.

After the processing of step S40, the CPU 91 determines as to whether or not the execution of the changing processing is permitted, based on input performed via the display 71 or the operations button(s) 72 (step S41: determining processing). For example, in the case of FIG. 9, the CPU 91 determines as to whether or not the changing processing is permitted, based on a situation that the user touches a display part of "YES" or a display part of "NO" of the display 71.

Figure 8A:
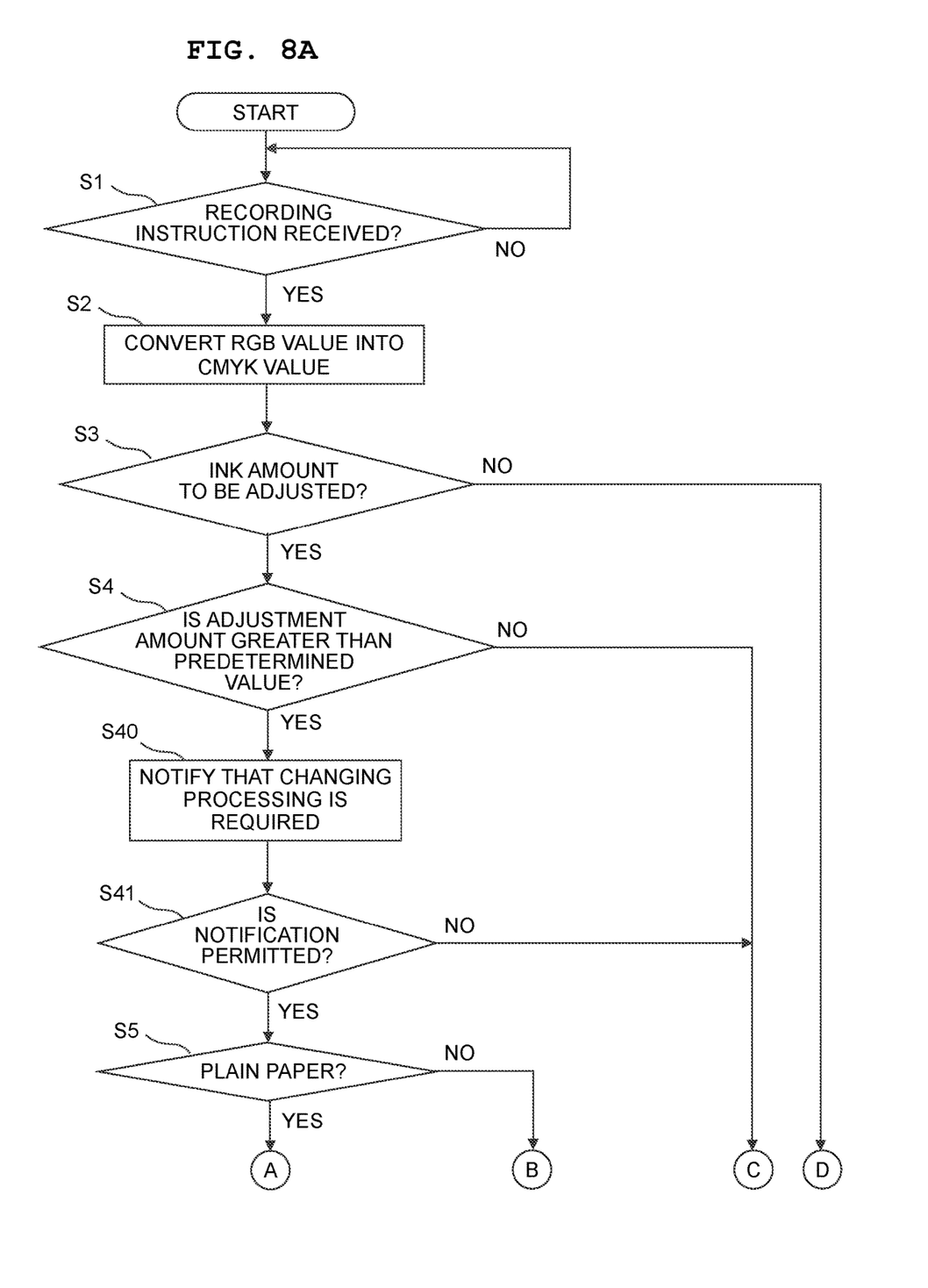
FIGS. 8A and 8B depict a flow chart indicating an application program corresponding to a print function executed by a CPU of a multifunction peripheral.
Figure 8B:
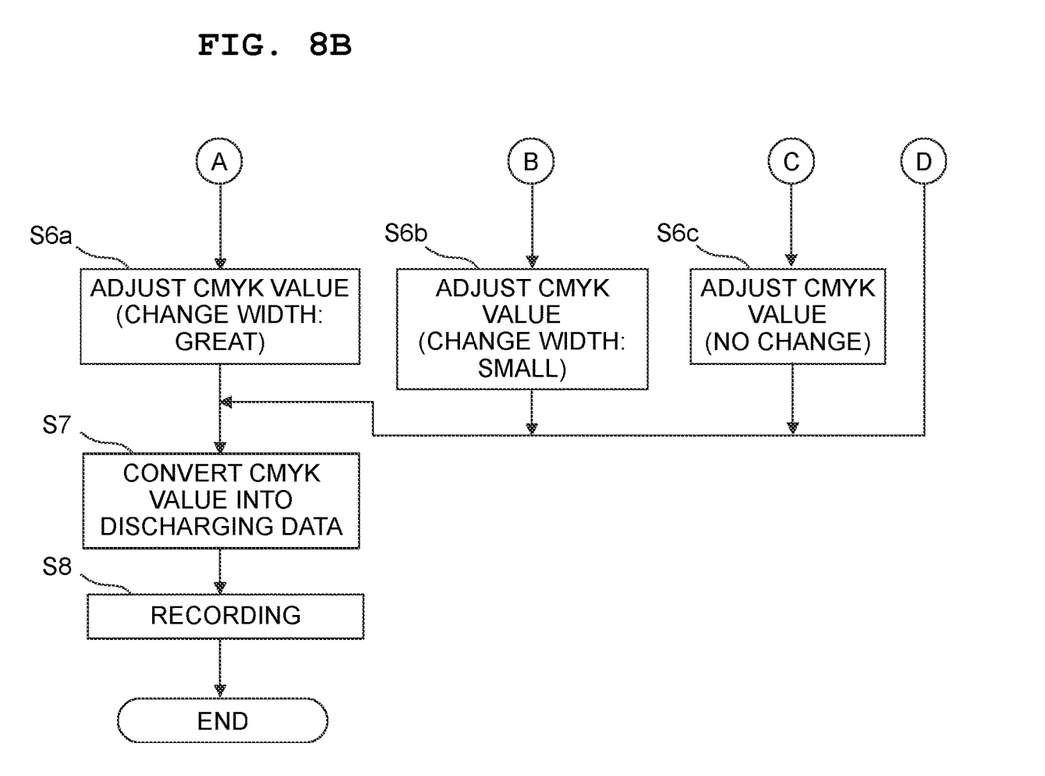

In a case that the CPU 91 determines that the execution of the changing processing is permitted (step S41: YES), the CPU 91 proceeds the processing to the processing of step S5 and executes the changing processing (step S6a or S6b). On the other hand, in a case that the CPU 91 determines that the execution of the changing processing is not permitted (step S41: NO), the CPU 91 adjusts the CMYK value obtained in the processing of step S2 based on the adjustment value, without executing the changing processing.

According to the fourth embodiment, the changing processing is not executed compulsory (forcibly); rather, the changing processing is executed based on a judgement of the user. With this, it is possible to realize a recording desired by the user.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

<Modification>

In the foregoing, although the embodiments of the present disclosure have been explained, the present disclosure is not limited to or restricted by the above-described embodiments; a various kinds of design change can be made to the present disclosure within the range described in the claims.

It is allowable to appropriately combine the configurations of the respective embodiments. For example, it is allowable to change the maximum value of the adjustment value as in the second embodiment (see FIGS. 6A and 6B), and to change the adjustment value itself as in the first embodiment (see FIG. 5). Alternatively, in a case that the dirtiness suppressing function is determined to be turned ON as in the third embodiment (see FIG. 7), it is allowable to change the maximum value of the adjustment value as in the second embodiment (see FIGS. 6A and 6B).

In the above-described embodiments, although the explanation has been given about the adjustment processing of the amount of the ink in the application program corresponding to the print function, it is allowable, for example, to perform an adjustment processing, in an application program corresponding to the copy function or the facsimile function, in a similar manner to that in the application program corresponding to the print function.

In the first embodiment, the adjustment value is changed in the case that the paper sheet P is the glossy paper, etc., (step S5: NO); and in the third embodiment, the adjustment value is changed in the case that the dirtiness suppressing function is turned OFF (step S35: NO). It is allowable, however, that the adjustment value is not changed. Namely, it is allowable that the change width of the adjustment value in the processing of step S6b is smaller than the change width of the adjustment value in the processing of step S6a, and may be 0 (zero).

Changing the maximum value of the adjustment value is not limited to, for example, to such a configuration that a value exceeding "0" (zero) is not displayed, as in the second embodiment (see FIG. 6B), in a case of changing the maximum value from "2" to "0". It is allowable to provide such a configuration that the value exceeding "0" (zero) is displayed but in a gray-out manner so that the user is not capable of performing an input.

In the above-described embodiments, although the input part is constructed of the display part 71 of the touch system, the input part may be an input part of a voice input system.

In the above-described embodiments, although the recording material is the ink, it is allowable that the recording material is a liquid different from the ink (for example, a treatment liquid which agglutinates or precipitates constituents in the ink, etc.). Further, the recording material is not limited to a liquid such as the ink, and may be a toner, etc.

In the above-described embodiments, although the recording part is of the serial system, the recording part may be of a line system. Further, the recording part is not limited to being of the liquid discharging (ejecting) system, and may be of a laser system, a thermal transfer system, etc.

The recording medium is not limited to the sheet or paper, and may be a cloth, a substrate, a plastic member, etc.

The recording apparatus according to the present disclosure is not limited to the multifunction peripherals. For example, the recording apparatus according to the present disclosure may be an apparatus which has a recording part but does not have a reading part.

What is claimed is:

1. A recording apparatus comprising:
   a recording part configured to perform a single-sided recording of an image onto a recording medium, with a recording material;
   an input part configured to accept an adjustment value input by a user; and
   a controller configured to adjust an amount of the recording material to be used at a time of the single-sided recording, based on the adjustment value, wherein
   the controller is configured to execute, based on an index value regarding dirtiness, a changing processing of changing at least one of the adjustment value and a value regarding the adjustment value, in a direction of decreasing the amount of the recording material, and
   the controller is configured to change, based on the index value regarding dirtiness, a maximum value of the adjustment value in the input part, that is allowed for input by the user in the changing processing.

2. The recording apparatus according to claim 1, wherein the controller is configured to change the adjustment value in the changing processing.

3. The recording apparatus according to claim 2, wherein the recording medium includes a first recording medium and a second recording medium, the index value of the first recording medium and the index value of the second recording medium being mutually different, and
   a change width of the value in the changing processing in a case that the first recording material is used is greater than a change width of the value in the changing processing in a case that the second recording material is used.

4. The recording apparatus according to claim 1, wherein the controller is configured to change a maximum value of the adjustment value in the changing processing, the maximum value being the value regarding the adjustment value and being input to the input part.

5. The recording apparatus according to claim 1, further comprising a receiving part configured to receive an ON signal of a dirtiness suppressing function, wherein
   the controller is configured to execute the changing processing in a case that the receiving part receives the ON signal.

6. The recording apparatus according to claim 1, wherein the controller is configured to execute:
   conversion of a pixel value of the image into a density value corresponding to a density of the recording material; and
   conversion of the density value into data indicating the amount of the recording material, and
   after the controller has executed the conversion of the pixel value of the image into the density value and before the controller executes the conversion of the density value into the data, the controller is configured to execute the changing processing and to adjust the density value based on the adjustment value which has been changed.

* * * * *